(12) United States Patent
Namuduri et al.

(10) Patent No.: US 10,293,804 B2
(45) Date of Patent: May 21, 2019

(54) HYBRID VEHICLE ENGINE STARTER SYSTEMS AND METHODS

(71) Applicant: GM GLOBAL TECHNOLOGY OPERATIONS LLC, Detroit, MI (US)

(72) Inventors: Chandra S. Namuduri, Troy, MI (US); Lei Hao, Troy, MI (US); Suresh Gopalakrishnan, Troy, MI (US); Thomas W. Nehl, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 53 days.

(21) Appl. No.: 15/159,070

(22) Filed: May 19, 2016

(65) Prior Publication Data

US 2017/0334422 A1   Nov. 23, 2017

(51) Int. Cl.
*B60W 20/10* (2016.01)
*B60K 6/26* (2007.10)
(Continued)

(52) U.S. Cl.
CPC .............. *B60W 20/10* (2013.01); *B60K 6/26* (2013.01); *B60K 6/442* (2013.01); *B60K 6/48* (2013.01);
(Continued)

(58) Field of Classification Search
CPC ......... B60W 20/10; B60K 6/26; B60K 6/442; B60K 2006/268; B60Y 2200/92;
(Continued)

(56) References Cited

U.S. PATENT DOCUMENTS

| 5,151,017 A | * | 9/1992 | Sears | .................... F04B 49/065 |
|---|---|---|---|---|
| | | | | 318/807 |
| 7,105,971 B2 | | 9/2006 | Asai et al. | |

(Continued)

FOREIGN PATENT DOCUMENTS

| CN | 2711983 Y | 7/2005 |
|---|---|---|
| CN | 101487434 A | 7/2009 |

(Continued)

OTHER PUBLICATIONS

"CNET on Cars—Car Tech 101: The move to higher-voltage electrical systems" YouTube video: https://www.youtube.com/watch?v=LvYQ9lfB7Yg, published Apr. 21, 2015, presented by Brian Cooley (Year: 2015).*

(Continued)

*Primary Examiner* — Thomas E Worden
(74) *Attorney, Agent, or Firm* — Quinn IP Law (57) ABSTRACT

A vehicle propulsion system includes an engine and a first electric machine each configured to selectively provide torque to propel the vehicle. The propulsion system also includes a second electric machine coupled to the engine and configured to start the engine from an inactive state. A high-voltage battery powers both of the first electric machine and the second electric machine over a high-voltage bus. The vehicle further includes a controller programmed to issue a command to start the engine using the second electric machine in response to a threshold acceleration demand following a period of reduced acceleration demand.

15 Claims, 4 Drawing Sheets

(51) Int. Cl.
*B60K 6/442* (2007.10)
*B60K 6/48* (2007.10)
*B60W 10/06* (2006.01)
*B60W 10/08* (2006.01)
*B60W 20/40* (2016.01)
*F02N 11/00* (2006.01)

(52) U.S. Cl.
CPC ............ *B60W 10/06* (2013.01); *B60W 10/08* (2013.01); *B60W 20/40* (2013.01); *F02N 11/00* (2013.01); *B60K 2006/268* (2013.01); *B60K 2006/4825* (2013.01); *B60W 2540/10* (2013.01); *B60Y 2200/92* (2013.01); *B60Y 2300/182* (2013.01); *B60Y 2300/192* (2013.01); *B60Y 2300/43* (2013.01); *B60Y 2300/60* (2013.01); *B60Y 2300/63* (2013.01); *B60Y 2400/60* (2013.01); *Y02T 10/6221* (2013.01); *Y02T 10/6252* (2013.01); *Y02T 10/6286* (2013.01); *Y10S 903/906* (2013.01); *Y10S 903/93* (2013.01)

(58) Field of Classification Search
CPC ........ B60Y 2300/182; B60Y 2300/192; B60Y 2300/43; B60Y 2300/60; B60Y 2300/63; B60Y 2400/60; Y10S 903/906; Y10S 903/93
See application file for complete search history.

(56) References Cited

U.S. PATENT DOCUMENTS

| | | | |
|---|---|---|---|
| 7,116,065 B2 | 10/2006 | Wakitani et al. | |
| 7,482,724 B2 | 1/2009 | Fujiwara et al. | |
| 8,541,919 B2 | 9/2013 | Lokhandwalla et al. | |
| 9,121,380 B2 | 9/2015 | Fulton | |
| 9,567,922 B2 * | 2/2017 | Lofgren | B60K 6/24 |
| 2002/0153796 A1 | 10/2002 | Yoshinaga et al. | |
| 2003/0048024 A1 | 3/2003 | Chu | |
| 2003/0183430 A1 | 10/2003 | Naito et al. | |
| 2003/0189375 A1* | 10/2003 | Raad | B60L 7/00 303/20 |
| 2005/0099155 A1* | 5/2005 | Okuda | F02N 11/0866 320/107 |
| 2005/0140235 A1 | 6/2005 | Yamagishi et al. | |
| 2005/0236246 A1* | 10/2005 | Joki | B60K 17/02 192/35 |
| 2007/0007057 A1* | 1/2007 | Fujino | B60L 11/06 180/65.23 |
| 2007/0018522 A1 | 1/2007 | Ackva et al. | |
| 2007/0213151 A1 | 9/2007 | Usoro | |
| 2008/0079389 A1* | 4/2008 | Howell | H02J 7/1438 320/104 |
| 2008/0193275 A1 | 8/2008 | De Filippis et al. | |
| 2008/0203846 A1 | 8/2008 | Hoemann et al. | |
| 2009/0085418 A1 | 4/2009 | Kobayashi et al. | |
| 2009/0179518 A1 | 7/2009 | Tajima et al. | |
| 2009/0206660 A1* | 8/2009 | Makita | H02J 7/1423 307/9.1 |
| 2010/0001523 A1* | 1/2010 | Sato | B60K 6/48 290/31 |
| 2010/0236851 A1 | 9/2010 | Van Maanen et al. | |
| 2010/0300646 A1* | 12/2010 | Sawaguchi | H01M 10/48 165/51 |
| 2011/0009235 A1* | 1/2011 | Song | B60K 6/36 477/3 |
| 2011/0267851 A1* | 11/2011 | Nagel | H02M 3/155 363/37 |
| 2012/0025601 A1* | 2/2012 | Nefcy | F02N 11/0866 307/9.1 |
| 2012/0053011 A1* | 3/2012 | Onomura | B60K 6/383 477/3 |
| 2012/0126614 A1* | 5/2012 | Inoue | B60R 16/033 307/10.1 |
| 2012/0206109 A1* | 8/2012 | Fassnacht | H02J 7/1423 320/137 |
| 2013/0038271 A1* | 2/2013 | Park | B60K 6/28 320/104 |
| 2013/0106219 A1 | 5/2013 | Schneider et al. | |
| 2013/0138328 A1* | 5/2013 | Shimo | F02D 41/062 701/104 |
| 2013/0154397 A1 | 6/2013 | Sullivan | |
| 2013/0300371 A1* | 11/2013 | Bills | H02J 7/0016 320/118 |
| 2014/0015364 A1 | 1/2014 | Iwatsu et al. | |
| 2014/0091664 A1 | 4/2014 | Aoyama | |
| 2014/0292073 A1 | 10/2014 | Zhang et al. | |
| 2015/0105949 A1* | 4/2015 | Wright | B60W 10/02 701/22 |
| 2015/0112536 A1 | 4/2015 | Severinsky et al. | |
| 2015/0224845 A1* | 8/2015 | Anderson | B60G 17/019 701/37 |
| 2015/0239334 A1 | 8/2015 | El Baraka et al. | |
| 2015/0283964 A1 | 10/2015 | Janarthanam | |
| 2015/0295459 A1 | 10/2015 | Hao et al. | |
| 2015/0336573 A1 | 11/2015 | Swales et al. | |
| 2016/0006311 A1* | 1/2016 | Li | H02K 3/28 310/68 B |
| 2016/0032880 A1* | 2/2016 | Lovett | F02N 11/0803 701/22 |
| 2016/0056684 A1 | 2/2016 | Nemoto et al. | |
| 2016/0290304 A1* | 10/2016 | Yukawa | F02N 11/04 |
| 2017/0082012 A1* | 3/2017 | Jang | B60K 6/26 |
| 2017/0327106 A1* | 11/2017 | Johri | B60W 20/40 |
| 2017/0334297 A1* | 11/2017 | Hao | B60L 11/18 |
| 2017/0334422 A1* | 11/2017 | Namuduri | B60W 20/10 |
| 2017/0338706 A1* | 11/2017 | Hao | F02N 11/00 |
| 2018/0258900 A1 | 9/2018 | Namuduri et al. | |

FOREIGN PATENT DOCUMENTS

| | | |
|---|---|---|
| CN | 102025248 A | 4/2011 |
| CN | 102923124 A | 2/2013 |
| DE | 102008040830 A1 | 2/2010 |
| DE | 102011056431 A1 | 6/2013 |
| EP | 0619427 B1 | 10/1994 |
| JP | 2000104650 A | 4/2000 |
| JP | 2003148317 A | 5/2003 |
| JP | 2005-80381 A | 3/2005 |

OTHER PUBLICATIONS

Ayman M. El-Rafaie, "Fractional-Slot Concentrated-Windings Synchronous Permanent Magnet Machines: Opportunities and Challenges," IEEE Transactions on Industrial Electronics, vol. 57, No. 1, Jan. 2010, pp. 107-121.

Quanbao Zhou, John Houldcroft, "Cold engine cranking torque requirement analysis," SAE International Inc., 2007, JSAE 20077002.

Hao et al., Utility U.S. Appl. No. 15/811,740, filed Nov. 14, 2017.
Hao et al., Utility U.S. Appl. No. 15/158,887, filed May 19, 2016.
Hao et al., Utility U.S. Appl. No. 15/417,734, filed Jan. 27, 2017.
Namuduri et al., Utility U.S. Appl. No. 15/452,312, filed Mar. 7, 2017.
Namuduri et al., Utility U.S. Appl. No. 15/961,198, filed Apr. 24, 2018.
Namuduri et al., Utility U.S. Appl. No. 15/961,204, filed Apr. 24, 2018.

* cited by examiner

Fig-4

HYBRID VEHICLE ENGINE STARTER SYSTEMS AND METHODS

TECHNICAL FIELD

The present disclosure related to hybrid vehicle propulsion system engine starters and control methods.

INTRODUCTION

Combustion engines may have an electric starter coupled to the engine to turn a crankshaft leading up to a start event. The electric starter can be an electric motor having contact brushes to conduct current between stationary wires on a stator portion and moving parts of a rotor portion. The physical contacts may wear over time leading to motor degradation. Additionally, a brushed motor delivers substantially zero torque near the upper bound of its available speed range.

SUMMARY

A vehicle propulsion system includes an engine and a first electric machine each configured to selectively provide torque to propel the vehicle. The propulsion system also includes a second electric machine coupled to the engine and configured to start the engine from an inactive state. A high-voltage battery (e.g., greater than about 30 volts) powers both of the first electric machine and the second electric machine over a high-voltage bus. The vehicle further includes a controller programmed to issue a command to start the engine using the second electric machine in response to a threshold acceleration demand following a period of reduced acceleration demand.

A method of allocating sources of vehicle propulsion includes providing a powertrain having an engine and a first electric machine configured to selectively provide vehicle propulsion. The method also includes deactivating the engine in response to an acceleration demand less than a predetermined shutoff threshold. The method further includes reactivating the engine using a second electric machine powered over a high-voltage bus and coupled to the engine in response to the acceleration demand increasing to greater than a predetermined restart threshold.

A vehicle propulsion system includes a high-voltage power source and an electric machine capable of selectively propelling the vehicle using power from the high-voltage power source. The vehicle also includes an engine capable of selectively propelling the vehicle. A brushless permanent magnet motor is powered by the high-voltage power source and is configured to selectively couple to the engine and restart the engine from a deactivated state. The vehicle further includes a controller programmed to deactivate the engine in response to an acceleration demand less than a first threshold. The controller is also programmed to operate the brushless permanent magnet motor in response to an acceleration demand greater than a second threshold while the engine is in a deactivated state. The controller is further programmed to synchronize a speed of the brushless permanent magnet motor with a speed of the engine, and engage the brushless permanent magnet motor with the engine to restart the engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
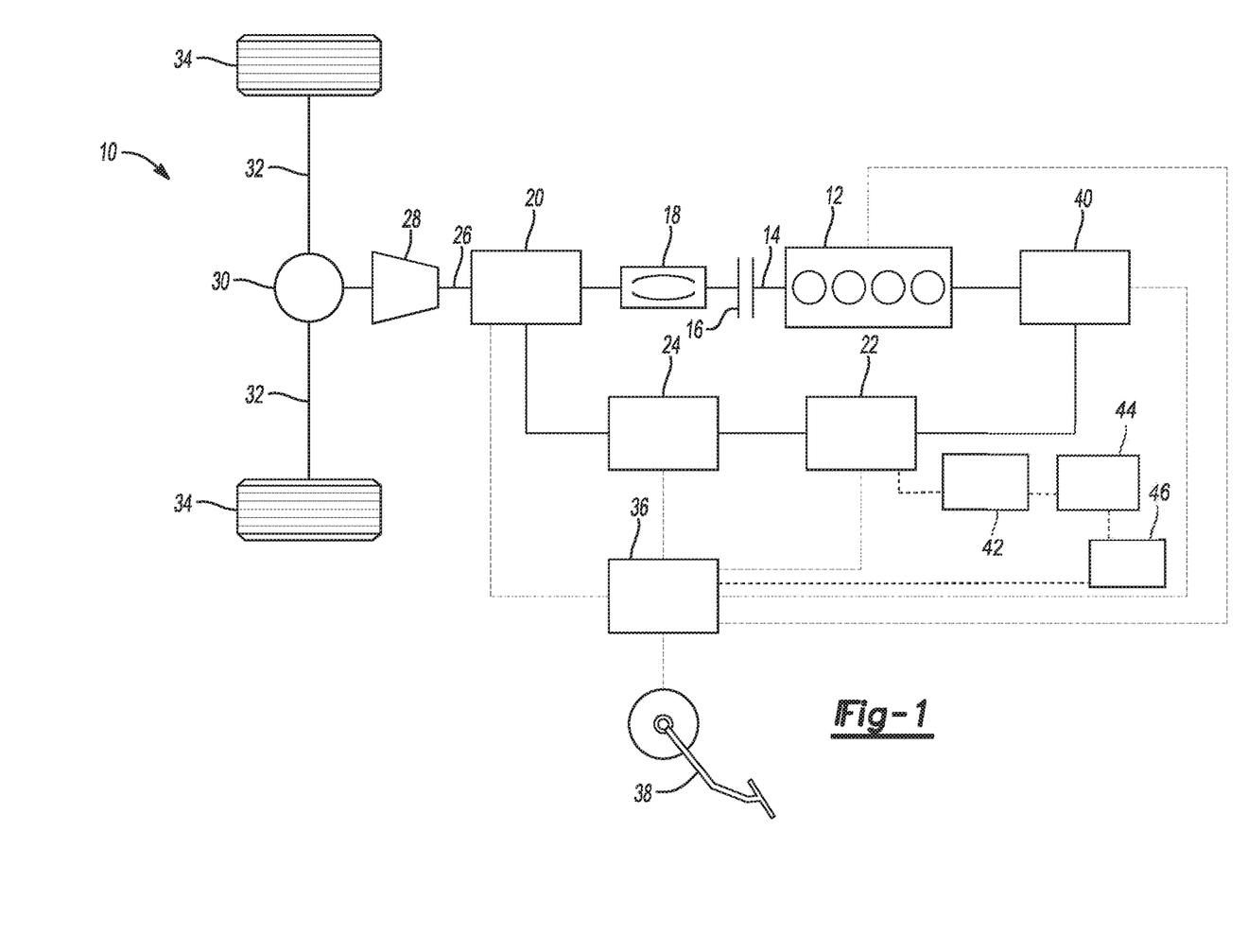
FIG. 1 is a system schematic of a hybrid vehicle propulsion system.

Referring to FIG. 1, a vehicle 10 is provided. By way of example, vehicle 10 is a hybrid electric vehicle (HEV) having a powertrain with both a petrol propulsion source and an electric propulsion source. Either or both of the propulsion sources may be selectively activated to provide propulsion based on the vehicle operating conditions. Internal combustion engine 12 operates as the petrol propulsion source and outputs torque to a shaft 14. The engine 12 may have a plurality of cylinders to generate power from the combustion of a fuel to cause rotation of the shaft 14. One or more decoupling mechanisms may be included along shaft 14 in order to decouple output of engine 12 from the remaining portions of the powertrain. A clutch 16 is provided to allow selection of a partial or complete torque decoupling of the engine 12. In one example clutch 16 is a friction clutch having a plurality of friction plates which are at least partially engaged when the clutch is closed to transfer torque, and disengaged when the clutch is opened to isolate torque flow between the downstream portions of the powertrain and the engine 12.

A torque converter 18 may also be included to provide a fluid coupling between the output portion of engine 12 and downstream portions of the driveline. The torque converter 18 operates to smoothly ramp up torque transfer passed from the engine to the driveline. Also, the torque converter allows a decoupling such that the engine may continue to operate at low rotational speed without causing propulsion of the vehicle (e.g., such as stationary idle conditions).

A first electric machine 20 operates as the electric propulsion source and is powered by a high-voltage traction battery 22. Generally, a high-voltage battery is one that has an operating voltage greater than 30 volts but less than 60 volts. In one example, the traction battery 22 is a lithium ion high-voltage battery with a nominal voltage of 48 volts. High-voltage direct current is conditioned by an inverter 24 before delivery to the first electric machine 20. The inverter 24 includes a number of switches and a control circuit which operate to convert the direct current into three-phase alternating current to drive the electric machine.

The first electric machine 20 has multiple operating modes depending on the direction of power flow. In a motor mode, power delivered from the high-voltage battery 22 allows the motor to output torque to shaft 26. The output torque may then be transferred through a variable ratio transmission 28 to change the gear ratio prior to delivery to a final drive mechanism 30. In one example the final drive mechanism 30 is a differential configured to distribute torque to one or more side shafts 32 which are coupled to wheels 34. The first electric machine 20 may be disposed either upstream of the transmission 28, downstream of the transmission 28, or integrated within a housing of the transmission 28.

The first electric machine 20 is also configured to operate in a generation mode to convert rotational motion into power to be stored at high-voltage battery 22. When the vehicle is moving, whether propelled by the engine or coasting from its own inertia, rotation of shaft 26 turns an armature, or rotor, (not shown) of the first electric machine 20. The motion causes an electromagnetic field to generate alternating current that is passed through the inverter 24 for conversion into direct current. The direct current may then be provided to the high-voltage battery 22 to replenish the charge stored at the battery. A unidirectional or bidirectional DC-DC converter 42 is used to charge a low-voltage (e.g., 12 volt) battery 44 and supply the low voltage loads 46 such as the conventional 12 volt loads. When a bidirectional DC-DC converter 42 is used, it is possible to provide power to the high-voltage battery 22 from the low-voltage battery 44.

The various propulsion system components discussed herein may have one or more associated controllers to control and monitor operation. Controller 36, although schematically depicted as a single controller, may be implemented as one controller, or as system of controllers in cooperation to collectively manage the propulsion system. Multiple controllers may be in communication via a serial bus (e.g., Controller Area Network (CAN)) or via discrete conductors. The controller 36 includes one or more digital computers each having a microprocessor or central processing unit (CPU), read only memory (ROM), random access memory (RAM), electrically-programmable read only memory (EPROM), a high speed clock, analog-to-digital (A/D) and digital-to-analog (D/A) circuitry, input/output circuitry and devices (I/O), as well as appropriate signal conditioning and buffering circuitry. The controller 36 may also store a number of algorithms or computer executable instructions needed to issue commands to perform actions according to the present disclosure.

The controller 36 is programmed to monitor and coordinate operation of the various propulsion system components. The controller 36 is in communication with the engine 12 and receives signals indicative of at least engine speed, temperature, as well as other engine operating conditions. The controller 36 is also in communication with the first electric machine 20 and receives signals indicative of motor speed, torque, and current draw. The controller may also be in communication with battery 22 and receive signals indicative of at least battery state of charge (SOC), temperature, and current draw. The control also receives signals indicative of the circuit voltage across the high-voltage bus. The controller 36 may further be in communication with one or more sensors at a driver input pedals 38 to receive signals indicative of pedal position which may reflect acceleration demand of the driver. The driver input pedal 38 may include an accelerator pedal and/or a brake pedal. In alternative embodiments such as a self-driving autonomous vehicle, acceleration demand may be determined by a computer either on-board or off-board of the vehicle without driver interaction.

As mentioned above, either one or both of the engine 12 and the first electric machine 20 may be operated at a particular time based at least on the propulsion requirements of the vehicle. During high torque demand conditions, the controller 36 may cause both of the engine 12 and the first electric machine 20 to be activated such that each provides an output torque which in combination propel the vehicle 10.

In certain moderate torque required conditions, the engine operates efficiently and may be used as the sole propulsion source. For example, during highway driving with a generally constant speed, the first electric machine 20 may be deactivated such that only the engine 12 provides output torque.

Under other example operating conditions, the engine 12 may be deactivated such that only the electric machine 20 provides output torque. The clutch 16 may be opened to decouple the shaft 14 from the downstream portions of the powertrain. Specifically, during vehicle coast conditions where a driver allows the vehicle to decelerate under its own resistance, the engine may be deactivated and the motor operated in generator mode to recover energy. Additionally, engine deactivation may be desirable during a temporary vehicle standstill such as at a traffic light. Instead of allowing the engine to idle, fuel consumption may be reduced by deactivating the engine while the vehicle is stationary. In both examples, it may be beneficial to rapidly restart the engine in response to a subsequent increase in propulsion demand. A prompt engine startup may avoid roughness and/or latency in power delivery being perceived by a driver.

Vehicle 10 includes a second electric machine 40 that is selectively coupled to the engine 12. The second electric machine 40 operates as a starter motor and when engaged with the engine leading up to a combustion cycle, turns a crank portion of the engine to facilitate a cold start or a restart. The second electric machine 40 may be connected to a flywheel portion of the engine through a geared mechanical connection to pass torque to the crankshaft to start the engine. In another example, the second electric machine 40 may be connected to a crank pulley through a toothed belt mechanical connection to pass torque to the crankshaft of the engine. According to aspects of the present disclosure, the controller 36 is programmed to issue a command to start the engine 12 using the second electric machine 40 in response to an acceleration demand following a period of reduced acceleration demand.

The second electric machine 40 is selectively engageable to the engine through a sliding pinion gear within an electric machine housing. A first solenoid may be disposed to actuate the pinion gear from a first disengaged position to a second position that is in mechanical connection with the engine crankshaft to transfer torque. As discussed above there may be different configurations of intermediate components to provide gear ratio adjustments and/or geometric adjustments due to powertrain package constraints. The first solenoid may receive a signal to engage the pinion gear once the electric machine is at a suitable speed for smooth torque transfer to start the engine.

When the engine is restarted, it may be restarted from substantially zero rotational speed, or from a speed which is significantly less than the rotational speed of the downstream powertrain components such as the first electric machine 20. The controller 36 may implement a delay following the initial restart of the engine 12 to allow engine speed to ramp up to be within a predetermined range of the system speed prior to closing the clutch 16. Reducing the difference between engine speed and speed of the downstream components improves the smoothness of the engagement of the clutch 16 and reduces NVH perceived by a passenger related to the engine restart event. However, this delay may lead to a perceivable lag in the delivery of additional propulsion torque required from the engine.

Some powertrain systems may include a brush contact type of starter motor coupled to the engine to provide the startup function. The starter motor is commonly powered by a low-voltage battery connected over a low-voltage bus. It may be powered by low-voltage battery 42 for example, or by a supplemental low-voltage power source. Conventional low-voltage batteries typically have a nominal voltage of about 12 volts and generally less than 18 volts. Low voltage loads 46 such as vehicle accessories are also commonly powered over the same low-voltage bus.

It may be undesirable to keep a brushed contact starter motor connected to the power source on an ongoing basis. Therefore brushed contact starter motor systems commonly include a second solenoid to actuate a mechanical connection to an electrical terminal to provide power. When it is desired to start the engine, the first solenoid and second solenoid must both be actuated. In many instances the actuation must be performed sequentially. For example, the second solenoid may be actuated to provide power to allow the starter motor to build up rotational speed. Then the first solenoid may be actuated to mechanically engage the starter motor output to the engine to facilitate the start event. Such a sequential actuation of multiple solenoids to operate the starter motor may contribute to an undesirable time delay for an engine restart.

When the engine is started, a temporary voltage drop is caused by the power load of the starter motor. A passenger may perceive certain symptoms such as lamp illumination levels dropping or temporary degraded function of other electrically-powered accessories due to the voltage drop. To avoid such undesirable symptoms, compensation means may be used but may have disadvantages. For example an additional DC-DC boost converter may be provided to temporarily step up the voltage to mask potential symptoms related to a voltage drop caused by the starter motor. Alternatively, a second power source may be provided to supplement the battery and compensate for a voltage drop. Each of the above examples of a voltage drop compensation means may increase cost, weight, and complexity of the propulsion system.

The brush contact type of motor may also be inherently limited in the time required to start the engine. Related to the construction of the brush contact motor, windings affixed to the rotor increase both the size and the mass of the rotor. The additional rotational inertia of the rotor may cause a higher duration of time to reach a desired rotational speed from rest. This adds to the duration of the engine restart and subsequently may limit the responsiveness of the propulsion system.

According to an aspect of the present disclosure, the second electric machine 40 is a brushless permanent magnet DC motor coupled to the engine 12 to provide a starting torque to restart the engine 12. The second electric machine 40 is powered by the high-voltage traction battery 22 over the high-voltage bus. The high-voltage operation of the second electric machine 40 provides rapid engine restarts that enable quick acceleration following engine deactivation during coasting for example.

Operating the second electric machine 40 over the high-voltage bus eliminates the need for a boost converter to stabilize the voltage in the circuit due to power draw. The second electric machine is powered by the same power source as the traction motor, or first electric machine 20. Utilizing a single high-voltage power source also avoids the need for a supplemental power source to mitigate voltage drops caused by starter operation. Further, by powering the second electric machine over the separate high-voltage bus, electrical isolation may be achieved between the engine starting function and other vehicle accessory functions.

The brushless electric machine may be any of a number of known motor types such as a surface permanent magnet machine, an internal permanent magnet machine, a drag-cup induction machine, or a switched reluctance machine for example. Brushless motors provide the additional benefit of increased duration of usable life due to the elimination of physical wear from contact of brushes at the commutator. Further, an electronically commutated electric machine may be capable of more precise control of motor speed as compared to a brushed motor. In some examples, the second electric machine may be operated using a field weakening control strategy to further improve control of the power output. According to aspects of the present disclosure, the output speed of the second electric machine is synchronized with the speed of the engine to reduce noise, vibration, and harshness (NVH) which may occur during a restart event.

Brushless electric machine 40 may also include at least one integrated circuit which is programmed with control logic to perform electronic commutation as opposed to physical contacts employed by a brush motor. The electronic commutation may be achieved by a plurality of solid-state switches (e.g., MOSFET, IGBT type transistors) included within a housing of the electric machine. The switches are independently and selectively connectable to the high-voltage power source. Multiple stages of a commutation sequence are achieved by activating the switches in a sequence to create a rotating magnetic field within the electric machine. Based on selection of particular switches and the rate of actuation, the speed and the output torque of the motor may be precisely controlled. In this way, a separate inverter may not be required to convert direct current from the high-voltage battery 22 into three-phase alternating current to drive the electric machine 40. The electric machine 40 may also include internal sensors (e.g., Hall effect sensors) to detect the position and speed of the motor. This position feedback may be used to input the control logic to influence the actuation of the solid-state switches. The integrated circuit performs electronic commutation of the solid-state switches in conjunction with the rotor position sensors to convert direct current from the high-voltage power source into alternating current to drive the brushless permanent magnet motor. The control logic may also include protection against undesirable motor conditions such as overcurrent, short-circuit, and thermal overheating. The integrated circuit may be additionally programmed to execute a control action in response to detection of one or more error conditions of the motor.

The integrated circuit as discussed above may eliminate the need for a dedicated solenoid to engage and disengage the electrical connection between the second electric machine and the power source. The internal solid-state switches may be used to electrically isolate the electric machine from the power source without mechanical actuation of a solenoid. According to aspects of the present disclosure, the starter electric machine is provided with a single solenoid actuator to selectively couple the second electric machine to the engine, and the second electric machine is connected to the high-voltage battery via the solid-state switches. No solenoid is provided to achieve an electrical connection to the power source.

By using a brushless electric machine the inertia of the rotor may be significantly reduced. The windings are located on the stator thereby reducing the mass of the rotor. For example, a center portion of the rotor may be configured to be hollow to provide mass reduction. Further, permanent magnets of the rotor may be inset relative to an outer surface of the rotor to position the magnets closer to the axis of rotation of the rotor. In one example, the brushless electric machine may have an inertia value of about $1.205 \times 10^{-4}$ kg-m$^2$. The combination of the reduced inertia of the electric machine and the high-voltage power supply enables a faster wind up of the electric machine, and thus a more rapid engine restart.

Figure 2:
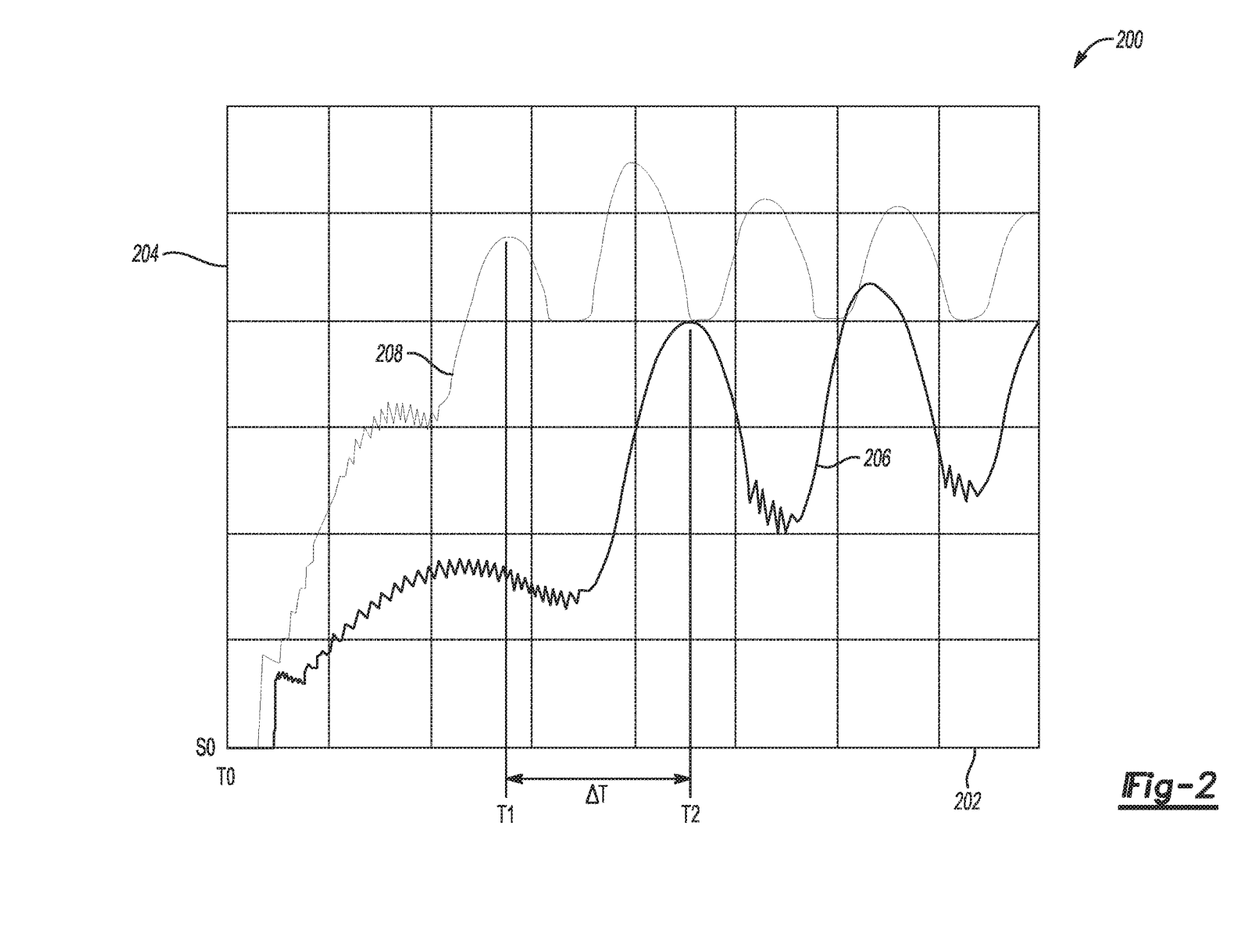
FIG. 2 is a plot of engine crank performance.

Referring to FIG. 2, plot 200 depicts engine crank performance during an initial portion of a restart event using different types of starter configurations. Horizontal axis 202 represents time, and vertical axis 204 represents engine rotational speed. Curve 206 represents an engine start event driven by a conventional brush commutator starter motor powered over a low-voltage bus. In the example provided, the motor is a 1.8 kW brushed motor powered over a 12 volt bus. Curve 208 represents an engine restart event driven by a brushless permanent magnet electric machine powered over a high-voltage bus. In the example of curve 208, the brushless permanent magnet electric machine includes 24 turns of wire on each section of the stator, where the electric machine is powered over a 40 volt bus. Both systems are plotted for a startup event initiated from an inactive state at rest. By way of example, the first full compression of the engine occurs at about time T2 for the conventional starter of curve 206. In comparison, the first full compression of the engine occurs at about time T1 for an example starter of curve 208 according aspects of the present disclosure. In the comparative example provided in plot 200 where the time increments may be about 100 milliseconds, the time improvement ΔT may be seen to be about 200 milliseconds. While certain parameters are provided by way of example, it should be appreciated that aspects of the present disclosure operate across a range of motor specifications to improve engine restart responsiveness, starter usable life, while avoiding undesirable symptoms of a voltage drop occurring on the low-voltage bus due to engine start.

Figure 3:
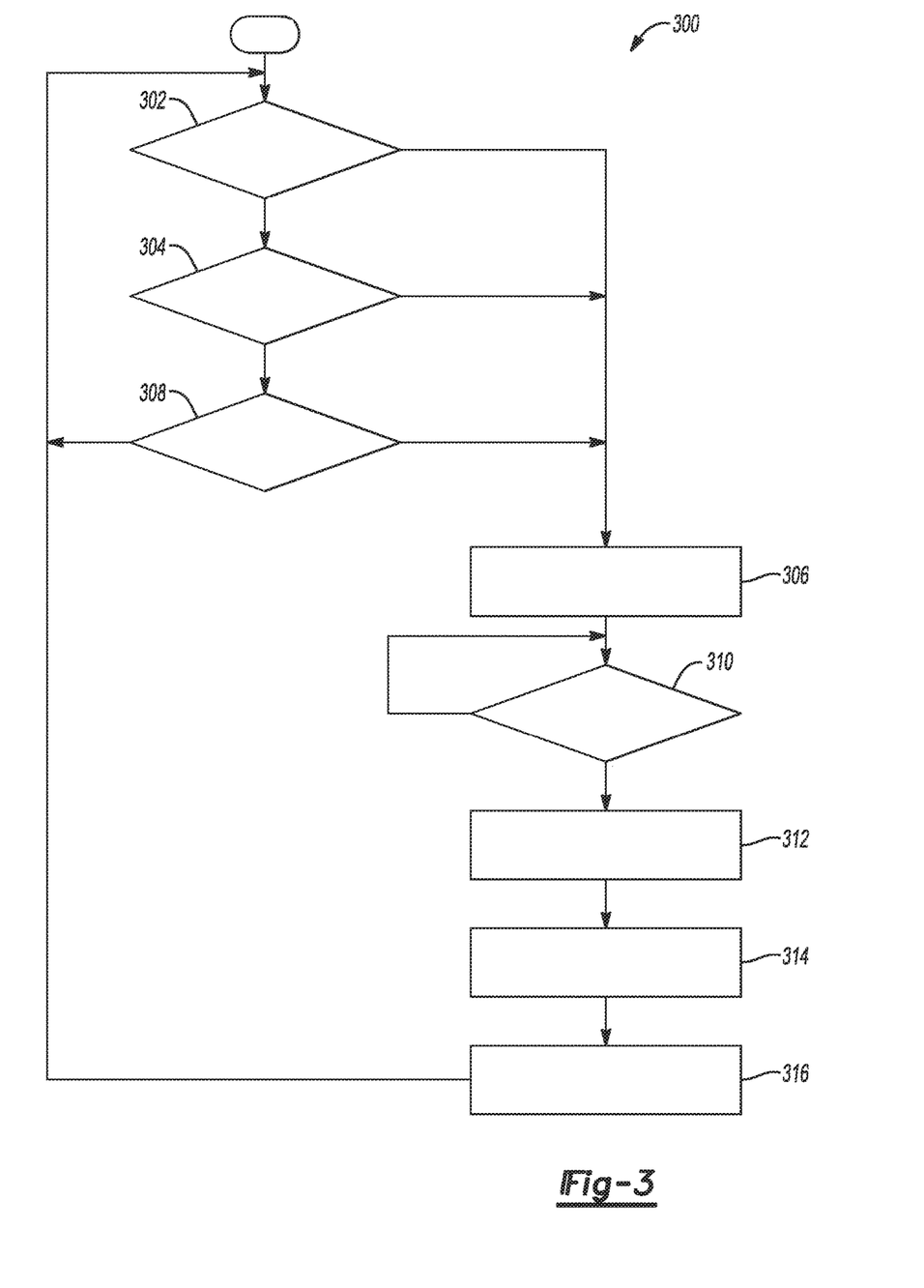
FIG. 3 is a flowchart of a method of torque allocation for a hybrid vehicle propulsion system.

Referring to FIG. 3, a method 300 of allocating sources of propulsion in a hybrid vehicle system is presented. The hybrid vehicle is provided with a powertrain having an engine and a first electric machine configured to selectively provide vehicle propulsion. At step 302 the method includes determining whether the vehicle is at a standstill such as having a zero velocity with the brake pedal applied. If the vehicle is not at a standstill at step 302, the method includes determining at step 304 whether the vehicle is undergoing a rolling coast condition such as zero acceleration demand while moving. According to an aspect of the present disclosure both of step 302 and step 304 may include detection of a substantially zero acceleration demand. If at either step a zero acceleration demand is detected (i.e., vehicle standstill at step 302 or rolling coast at step 304), the method includes deactivating the engine at step 306.

Alternatively, the method may include deactivating the engine under other operating conditions. If at step 304 the vehicle is not undergoing a rolling coast condition, the method includes detecting whether the acceleration demand is less than a predetermined shutoff threshold $T_{SHUTOFF}$. If the acceleration demand is sufficiently low, the method includes deactivating the engine at step 306. The low acceleration demand may be satisfied by an electric propulsion source such as an electric machine operating as a traction motor.

Once the engine is deactivated at step 306, the method includes continuing to monitor at step 310 for changes in acceleration demand sufficient to warrant restarting the engine. If at step 310 the acceleration demand is greater than a predetermined restart threshold $T_{RESTART}$, the method includes activating at step 312 an electric machine which operates as a starter motor. As discussed above, the electric machine is activated or powered by a high-voltage battery over a high-voltage bus. In one example, the restart threshold $T_{RESTART}$ is greater than the shutoff threshold $T_{SHUTOFF}$ to avoid hysteresis effects causing excessing on-off cycling of the engine when acceleration demand fluctuates near one of the thresholds.

As discussed above, the engine may be deactivated under conditions where the vehicle is rolling. Therefore the engine continues to rotate for a period of time following deactivation. If acceleration demand increases a restart may be prompted while the engine is still rotating. To avoid unnecessary NVH related to the engine restart, at step 314 the speed of the starter electric machine is synchronized to match the rotational speed of the engine prior to engaging the starter to restart the engine.

Once the speed of the starter electric machine is synchronized to the engine rotation speed, the method includes at step 316 engaging the starter with the engine to restart the engine. The method further includes continuing to monitor the various vehicle operating parameters for conditions which may prompt additional engine deactivation as discussed above.

Figure 4:
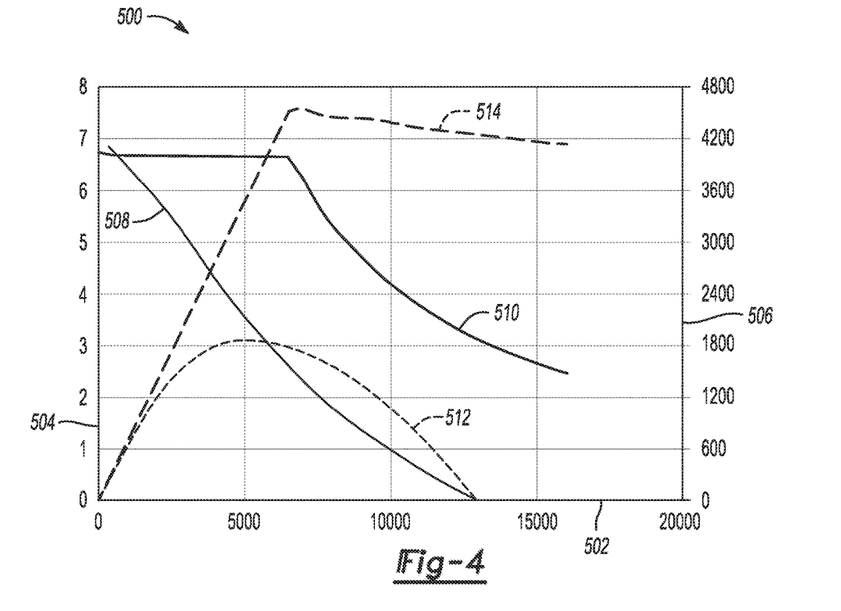
FIG. 4 is a plot of electric machine output.

Referring to FIG. 4, a plot 500 depicts output of a pair of electric machines according to aspects of the present disclosure. Horizontal axis 502 represents rotational speed in rotations per minute (RPM). The left side vertical axis 504 represents output torque of the electric machines in Newton-meters (N-m). The right side vertical axis 506 represents output power of the electric machines in Watts. Each of torque and power are plotted for both a brushed motor and a brushless permanent magnet motor according to certain aspects discussed above. Curve 508 represents an output torque profile for a brushed motor. Curve 510 represents output torque profile for a brushless electric machine. It may be seen by comparison that aspects of the present disclosure provide a wider range of relatively constant output torque. For example, between about 0 and 7000 RPM, the brushless motor configuration is capable of outputting relatively constant torque at about 6.7 N-m. In contrast, the brushed motor torque profile is generally linear in this range having a negative slope and in the lower RPM ranges outputs significantly less torque. Further, it may be seen that the output torque of the brushed motor depicted by curve 508 drops to zero at about 12,500 RPM, whereas the output torque of the brushless configuration represented by curve 510 provides higher torque output for higher RPM ranges. For example the electric machine provided according to aspects of the present disclosure outputs about 2.5 N-m as high as 16,000 RPM.

Power output is also significantly improved according to aspects of the present disclosure. Curve 512 represents an output power profile for a brushed motor and curve 514 represents an output power profile for a brushless electric machine applied according to aspects of the present disclosure. It may be seen by a comparison between curves 512 and 514 that the brushless electric machine configuration is capable of outputting higher power levels, for example around 4,500 Watts. Additionally, the power output of the brushed electric motor decreases to zero at about 12,500 RPM, whereas relatively constant power is able to be output from the brushless electric machine at significantly higher speeds. For example the brushless electric machine is capable of delivering around 4,200 Watts output as high as 16,000 RPM. The wider constant operating outputs of the brushless electric machine, as well as higher peak power output, serve to provide more responsive engine starts as compared to a conventional brushed motor starter.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle propulsion system for a vehicle, the vehicle propulsion system comprising:
   an engine and a first electric machine each configured to selectively provide torque to propel the vehicle;
   a second electric machine coupled to the engine and configured to start the engine from an inactive state; wherein the second electric machine is a brushless permanent magnet motor having a housing; wherein the brushless permanent magnet motor includes a rotor with a hollow center portion, has an output torque of 2.5 Newton-meters at 16,000 revolutions per minute, and has an inertia value of $1.205 \times 10^{-4}$ kilograms-square meter;
   a high-voltage battery to power both of the first electric machine and the second electric machine over a high-voltage bus; wherein the high-voltage battery has an operating voltage of at least 30 volts;
   an inverter integrated as a circuit within the housing and having a plurality of solid-state switches independently and selectively connectable to the high-voltage battery and operable to convert direct current from the high-voltage battery to alternating current to drive the brushless permanent magnet motor;
   a bi-directional DC-DC converter;
   a low-voltage battery configured to power at least one vehicle accessory over a low-voltage bus; wherein the low-voltage battery is operatively connected to the high-voltage battery via the bi-directional DC-DC converter and is operable to provide electrical power to the high-voltage battery via the bi-directional DC-DC converter; wherein only the high-voltage bus and not the low-voltage bus is connected to the second electric machine so that only the high-voltage battery and not the low-voltage battery provides electrical power to the second electric machine to start the engine; and
   a controller operatively connected to the inverter and programmed to issue a command to start the engine using the second electric machine in response to a threshold acceleration demand following a period of reduced acceleration demand.

2. The vehicle propulsion system of claim 1 wherein the high-voltage battery has a nominal voltage of 48 volts.

3. The vehicle propulsion system of claim 1 wherein the low-voltage battery is configured to power at least one vehicle accessory over the low-voltage bus.

4. The vehicle propulsion system of claim 1 wherein the controller is further programmed to deactivate the engine in response to a coast condition corresponding to substantially zero acceleration demand while the vehicle is moving.

5. The vehicle propulsion system of claim 1 wherein the second electric machine is provided with a single solenoid actuator to selectively, mechanically couple the second electric machine to the engine, and the second electric machine is selectively, electrically connected to the high-voltage battery via the solid-state switches.

6. The vehicle propulsion system of claim 1 wherein the engine is configured to be deactivated during a vehicle rolling coast condition.

7. The vehicle propulsion system of claim 1, wherein the engine and the second electric machine are each configured to selectively provide torque to a single set of vehicle wheels.

8. A vehicle propulsion system for a vehicle, the vehicle propulsion system comprising:
   a high-voltage battery; wherein the high-voltage battery has an operating voltage of at least 30 volts;
   an electric machine capable of selectively propelling the vehicle using power from the high-voltage battery;
   an engine capable of selectively propelling the vehicle;
   a brushless permanent magnet starter motor having a housing; wherein the brushless permanent magnet starter motor is directly coupled to and powered by the high-voltage battery over a high-voltage bus and is configured to couple to the engine and restart the engine from a deactivated state; wherein the brushless permanent magnet starter motor includes a rotor with a hollow center portion, has a power output of 4200

Watts at 16,000 revolutions per minute, and has an inertia value of $1.205 \times 10^{-4}$ kilograms-square meter;

an inverter integrated as a circuit within the housing and having a plurality of solid state switches independently and selectively connectable to the high-voltage battery and operable to convert direct current from the high-voltage battery to alternating current to drive the brushless permanent magnet starter motor;

a bi-directional DC-DC converter;

a low-voltage battery configured to power at least one vehicle accessory over a low-voltage bus; wherein the low-voltage battery is operatively connected to the high-voltage battery via the bi-directional DC-DC converter and is operable to provide electrical power to the high-voltage battery via the bi-directional DC-DC converter; wherein only the high-voltage bus and not the low-voltage bus is connected to the brushless permanent magnet starter motor so that only the high-voltage battery and not the low-voltage battery provides electrical power to the brushless permanent magnet starter motor to start the engine; and a controller programmed to
deactivate the engine in response to an acceleration demand less than a first threshold,
operate the brushless permanent magnet starter motor in response to an acceleration demand greater than a second threshold while the engine is in a deactivated state,
synchronize a speed of the brushless permanent magnet starter motor with a speed of the engine, and
engage the brushless permanent magnet starter motor with the engine to restart the engine.

9. The vehicle propulsion system of claim 8 wherein the controller is further programmed to deactivate the engine in response to a coast condition corresponding to substantially zero acceleration demand while the vehicle is rolling.

10. The vehicle propulsion system of claim 8 wherein the controller is further programmed to deactivate the engine in response to a standstill condition corresponding to substantially zero acceleration demand.

11. The vehicle propulsion system of claim 8 wherein the second threshold is greater than the first threshold.

12. The vehicle propulsion system of claim 8 wherein the brushless permanent magnet starter motor is provided with a single solenoid actuator to selectively couple the brushless permanent magnet starter motor to the engine.

13. The vehicle propulsion system of claim 8 further comprising a rotor position sensor operable to sense a rotational position of the rotor of the brushless permanent magnet starter motor.

14. A system comprising:
an engine and an electric machine each configured to selectively provide torque;
a brushless permanent magnet starter motor coupled to the engine and configured to start the engine from an inactive state; wherein the brushless permanent magnet starter motor includes a rotor with a hollow center portion, has an output torque of 2.5 Newton-meters at 16,000 revolutions per minute, and has an inertia value of $1.205 \times 10^{-4}$ kilograms-square meter; and
a high-voltage battery to power both of the electric machine and the brushless permanent magnet starter motor only over a high-voltage bus; wherein the high-voltage battery has an operating voltage of at least 30 volts.

15. A system comprising:
an engine and a first electric machine each configured to selectively provide torque;
a second electric machine coupled to the engine and configured to start the engine from an inactive state; wherein the second electric machine is a brushless permanent magnet starter motor; wherein the second electric machine includes a rotor with a hollow center portion, has a power output of 4200 Watts at 16,000 revolutions per minute, and has an inertia value of $1.205 \times 10^{-4}$ kilograms-square meter;
a high-voltage battery to power both of the first electric machine and the second electric machine over a high-voltage bus; wherein the high-voltage battery has an operating voltage of at least 30 volts;
a bi-directional DC-DC converter;
a low-voltage battery configured to power at least one vehicle accessory over a low-voltage bus; wherein the low-voltage battery is operatively connected to the high-voltage battery via the bi-directional DC-DC converter and is operable to provide electrical power to the high-voltage battery via the bi-directional DC-DC converter; wherein only the high-voltage battery and not the low-voltage battery provides electrical power to the second electric machine to start the engine; and
a controller programmed to issue a command to start the engine using the second electric machine.

* * * * *